(12) United States Patent
Irons et al.

(10) Patent No.: US 7,338,643 B2
(45) Date of Patent: Mar. 4, 2008

(54) INTEGRATED MEMBRANE SHIFT METHANATION REACTOR FOR CARBON MONOXIDE CLEAN-UP

(75) Inventors: Ian Barrey Irons, Reading (GB); Julia Margaret Rowe, Wallingford (GB); Peter Geoffrey Gray, Reading (GB); Peter Albert Walker, Reading (GB)

(73) Assignee: General Motors Corporation, Detroit, MI (US)

( * ) Notice: Subject to any disclaimer, the term of this patent is extended or adjusted under 35 U.S.C. 154(b) by 501 days.

(21) Appl. No.: 10/389,829

(22) Filed: Mar. 17, 2003

(65) Prior Publication Data
US 2004/0185312 A1   Sep. 23, 2004

(51) Int. Cl.
  *B01J 8/00*  (2006.01)
  *B01J 7/00*  (2006.01)
(52) U.S. Cl. ............... 422/187; 422/188; 422/190; 422/192; 422/196; 422/205; 422/224; 422/228; 48/61; 48/127.9; 48/128; 48/198.7; 48/215; 429/19; 429/20
(58) Field of Classification Search ............... 48/127.9, 48/94; 422/192, 190
See application file for complete search history.

(56) References Cited

U.S. PATENT DOCUMENTS

| | | | |
|---|---|---|---|
| 3,469,944 A * | 9/1969 | Bocard et al. ............... 423/650 |
| 5,516,344 A | 5/1996 | Corrigan | |
| 6,096,286 A | 8/2000 | Autenrieth | |
| 6,129,861 A | 10/2000 | Meusinger et al. | |
| 6,221,117 B1 | 4/2001 | Edlund et al. | |
| 6,231,831 B1 | 5/2001 | Autenrieth et al. | |
| 6,290,877 B2 | 9/2001 | Naka et al. | |
| 6,919,062 B1 * | 7/2005 | Vasileiadis et al. ...... 423/437.1 |
| 2004/0072683 A1* | 4/2004 | Kodas et al. ............... 502/224 |

FOREIGN PATENT DOCUMENTS

| | | |
|---|---|---|
| JP | 20022068710 | 3/2002 |
| WO | WO 99/06138 | 2/1999 |

* cited by examiner

*Primary Examiner*—Glenn A. Caldarola
*Assistant Examiner*—Kaity Handal (57) ABSTRACT

A reformate clean-up reactor. The reactor takes a reformate stream and passes it through multiple subreactors that are integrated into a common reactor housing to reduce reformate stream by-product concentration prior to use of the reformate in a fuel cell. The reactor includes a gas shift subreactor to promote the conversion of carbon monoxide to carbon dioxide, a gaseous diffusion membrane subreactor to provide a hydrogen-rich portion of the reformate stream, and a methanation subreactor to convert carbon monoxide into methane and water. In applications where space for a fuel cell system is limited, the integration of the clean—up devices into a common housing provides significant improvements in structural and volumetric efficiency. Moreover, in at least one embodiment of the present invention, the juxtaposition of the gaseous diffusion membrane and the gas shift reactor improves membrane robustness. The purpose of the abstract is to enable the United States Patent and Trademark Office and the public generally to determine from a cursory inspection the nature and gist of the technical disclosure, and is not to be used for interpreting the scope of the claims.

26 Claims, 6 Drawing Sheets

INTEGRATED MEMBRANE SHIFT METHANATION REACTOR FOR CARBON MONOXIDE CLEAN-UP

BACKGROUND OF THE INVENTION

The present invention relates generally to a device for purifying fuel cell reformate, and more particularly to the integration of shift, membrane and methanation reactors into a compact housing to facilitate carbon monoxide removal.

While conventional power sources devices (such as internal combustion engines, including piston and gas turbine-based platforms) are well-known as ways to produce, among other things, motive, heat and electric power, recent concerns about the effects they and their fuel sources have on the environment has led to the development of alternative means of producing such power. The interest in fuel cells is in response to these and other concerns. One form of fuel cell, called the proton exchange membrane (PEM) fuel cell, has shown particular promise for vehicular and related mobile applications. A typical PEM construction includes an anode and a cathode, with a solid polymer electrolyte membrane spaced between them such that protons generated at the anode can travel through the electrolyte and to the cathode. In PEM fuel cells, hydrogen or a hydrogen-rich gas is supplied to the anode side of a fuel cell while oxygen (such as in the form of atmospheric oxygen) is supplied to the cathode side of the fuel cell. Catalysts, typically in the form of a noble metal (such as platinum), are placed at the anode and cathode to facilitate the ionization of hydrogen and subsequent reaction between the hydrogen and oxygen. While much of the present disclosure is in the context of PEM fuel cells, it will be appreciated by those skilled in the art that the invention disclosed herein has utility in other forms of fuel cells, where clean-up of fuel precursors can be used for improved fuel cell system operability, as well as for other processes where highly purified hydrogen feedstock is necessary.

In an ideal fuel supply situation, pure hydrogen gas is used as a direct fuel source. This is impractical in many vehicle-based fuel cell systems, as the amount of gaseous hydrogen required to be carried in order to achieve adequate vehicle range between refueling stops would be prohibitively large. A promising alternative to the direct feeding of hydrogen is the reformation of on-board liquid hydrocarbons through a fuel processing system upstream of the fuel cell. Methanol is an example of a readily-available hydrocarbon fuel, and accordingly has become one of the preferred hydrogen precursors, especially for volume-constrained mobile fuel cell applications. Its relative low cost and liquid state at practical temperatures of interest make it compatible with existing fuel delivery infrastructure. Unfortunately, during the conversion of methanol to hydrogen, carbon monoxide is also produced, of which even minute amounts can poison the noble metal catalyst on the downstream fuel cell anode and cathode. Accordingly, it becomes necessary to reduce the concentration of carbon monoxide to an acceptable level.

A typical fuel processing system incorporating methanol as the feed stock includes a reformer and one or more purification stages. There have emerged three general types of reformers that can be used on methanol and related liquid hydrocarbons: (1) steam reforming; (2) partial oxidation reforming; and (3) autothermal reforming. In the first variant, a pre-heated mixture of fuel and steam is reacted, while in the second variant, a pre-heated mixture of fuel and air is reacted. The third variant combines elements of both processes in a single reactor, and using a specially designed catalyst, enables balancing of the endothermic first and exothermic second variants. In all three cases, a reformate containing the desired end product, gaseous hydrogen, as well as undesirable carbon monoxide, is produced. A shift reactor may be employed to convert the carbon monoxide in the reformate. It has been found that to promote the following reaction in the direction shown, $$CO+H_2O \rightarrow CO_2+H_2,$$

the reformate should be cooled prior to sending it to the shift reactor. Serially connected shift reactors may be used to further reduce the carbon monoxide concentration. While this level of carbon monoxide cleanup could be sufficient for certain types of fuel cells, it is still not adequate for others, such as PEM fuel cells. Accordingly, additional steps must be taken to ensure that the concentration of carbon monoxide in the reformate is further reduced. Three common approaches exist for achieving the exceptionally low carbon monoxide concentrations necessary for proper PEM operation. In one method, carbon monoxide can be reacted with hydrogen, typically in the presence of a catalyst, to produce methane and water:

$$CO+3H_2 \rightarrow CH_4+H_2O$$

in what is termed a methanation reaction. In another method, thin hydrogen-permeable noble metal membranes deposited onto a porous carrier can be used to promote the diffusion and consequent purification of hydrogen in the reformate. The third method involves the selective oxidation of the carbon monoxide in the presence of a noble metal catalyst as follows:

$$2CO+O_2 \rightarrow CO_2.$$

Furthermore, two or more of these approaches may be used sequentially to achieve the desired level of carbon monoxide reduction. For example, the methanation device can be placed downstream (i.e., at the permeate side) of the membrane to react with any carbon monoxide that manages to get past the membrane. While the aforementioned approaches are capable of achieving aggressive carbon monoxide reduction goals, their inclusion results in added weight, volume and complexity to the fuel cell system. Accordingly, there exists a need to reduce the concentration of carbon monoxide in the reformate to very low levels while simultaneously minimizing the weight, cost, complexity and space occupied by fuel processing components.

BRIEF SUMMARY OF THE INVENTION

This need is met by the present invention, wherein disparate components used for the cleanup of excess carbon monoxide are integrated into a common reactor. According to a first aspect of the invention, a reactor for the removal of carbon monoxide from a reformate stream is disclosed. The reactor includes a housing and a flowpath disposed within the housing. The reformate stream passes into the flowpath, where equipment, including a shift subreactor, gaseous diffusion membrane subreactor and at least one methantion subreactor, are disposed within the housing to prepare the reformate for use in a downstream fuel cell. The first of these (the shift subreactor) converts at least some of the carbon monoxide present in the reformate stream into hydrogen and carbon dioxide. The second (the gaseous diffusion membrane subreactor) causes the stream to split into a permeate branch and a retentate branch, the former of which is hydrogen-rich relative to the latter, by allowing hydrogen in the reformate to pass through and into the permeate branch. The third (the methanation subreactor) further reduces the carbon monoxide concentration in the permeate branch by converting carbon monoxide to methane and water. The nature of the integrated reactor promotes efficient use of critical space, while also tending to reduce thermal latency, thus making the system more responsive to rapidly-changing system loads.

Optionally, the reactor includes at least one baffle disposed in the shift subreactor to promote a more tortuous path and consequent increase in the shift reaction of the reformate stream. In one form, the shift subreactor is a water gas shift subreactor, while the housing is generally tubular in shape such that the reformate stream can flow axially along the length of the tube. The flowpath may also be configured to define an annular shape in the tube. In such a configuration, the shift subreactor, gaseous diffusion membrane subreactor and methanation subreactor are concentrically placed relative to one another to define a generally cylindrical shape within an interior surface of the housing. An inert gas sweep mechanism can be included to transport the hydrogen-rich portion of the reformate stream resident in the permeate branch from the reactor to another component (such as a fuel cell) for subsequent use. This sweep can run either co-flow or counterflow relative to the axial flow direction of the reform ate stream. The shift subreactor can also be a solid cylindrical (i.e., rod-like) shape. In the present context, the distinction between "solid cylindrical" and annular is based on the presence or absence of a continuous axial opening, rather than the nature of the material making up the cylinder. Accordingly, a subreactor made from a porous substrate is still considered "solid", even though replete with porosity, if it does not contain a continuous axial channel. In the optional solid cylindrical configuration, the gaseous diffusion membrane subreactor is disposed on an outer surface of the shift subreactor, for example in the form of a thin layer, while the methanation subreactor is disposed on an outer surface of the gaseous diffusion membrane subreactor such that the permeate branch flows radially outward from the cylinder center. A second methanation subreactor can then be placed downstream of the retentate branch to further purify the retentate stream such that the purified portion coming therefrom can be joined with the already hydrogen-rich permeate branch in a recombination zone. The cylindrical shift subreactor can be further defined to be annular in shape such that a continuous axial channel extends therethrough. In this configuration, the gaseous diffusion membrane subreactor is disposed on an inner surface of the shift subreactor, rather than an outer surface when the shift reactor is a solid cylinder as previously described. Further, the methanation subreactor is disposed on an inner surface of the gaseous diffusion membrane subreactor such that the permeate branch flows radially inward from the annulus. In this annular construction, the shift subreactor, gas diffusion membrane subreactor and methanation subreactor define a substantially hollow longitudinal bore along the axial (longitudinal) centerline of the tubular housing. As with the aforementioned solid cylindrical configuration, a second methanation subreactor can be fluidly coupled to the reactor to accept the retentate branch in order to purify it into a similarly-configured recombination zone as previously discussed. In a variation on the annularly-configured shift subreactor, the methanation subreactor can be configured as a substantially solid cylindrical plug that can fit into and occupy the substantial entirety of the longitudinal bore defined by the inner surface of the gaseous diffusion membrane subreactor. In this configuration, both the retentate and permeate branches pass through the methanation subreactor for carbon monoxide conversion.

According to another aspect of the invention, a fuel processing system for a proton exchange membrane fuel cell is disclosed. In addition to a reactor such as described above for the removal of carbon monoxide from the fuel, the fuel processing system includes a reformer that can be fluidly coupled to a fuel supply from which fuel can be combined with an oxygen source (such as air) and fed into the reformer, where through various reformation reactions based on approaches such as steam reformation, partial oxidation or autothermal reforming, a reaction to convert the fuel (for example, methanol) can take place to produce a reformate stream made up of hydrogen and various by-products. From there, the reactor's shift subreactor, gaseous diffusion membrane subreactor and methanation subreactor clean up the reformate.

According to another aspect of the invention, a proton exchange membrane fuel cell system is disclosed. The system comprises a fuel supply and oxygen supply, a reformer configured to form a reformate vapor from a mixture of fuel and oxygen similar to that discussed above, a reactor for the removal of carbon monoxide from the reformate stream, and a fuel cell in fluid communication with the reactor. The hydrogen that comes from the reformer and reactor is subsequently routed to the fuel cell.

According to yet another aspect of the present invention, a power production system is disclosed. The system includes a supply of methanol as fuel, an oxygen supply, an evaporator configured to produce a reform ate stream from a mixture of methanol and oxygen, a reactor for the removal of carbon monoxide from the reformate stream, a fuel cell in fluid communication with the reactor, and a load coupled to the fuel cell's electrical circuit. The reactor is similar to that previously described. The fuel cell comprises a fuel flowpath fluidly coupled to the reactor, an anode in fluid communication with the fuel flowpath, an oxidant flowpath configured to permit fluid communication between an air supply and the fuel cell, a cathode in fluid communication with the oxidant flowpath, a membrane disposed between the anode and the cathode, a catalyst disposed on at least one of the anode and cathode, and an electrical circuit to carry current between the anode and cathode that is generated upon the consumption of fuel in the cell. The load is electrically coupled to the fuel cell's electrical circuit so that the electric current generated therein can be used by the load to produce useful power. Optionally, the load can be an energy storage device, such as battery or capacitive devices that could hold the energy until needed at a later time. The load could also be a means for converting the electric energy into mechanical energy, such as a vehicle drivetrain or similar rotating device where shaft power can be used to turn or move an attached device such as a wheel, gear or the like. Moreover, the power production system can be portable such that it can be used for mobile applications.

According to still another aspect of the present invention, a vehicle (which could be for example, a car, truck, aircraft, spacecraft, watercraft or motorcycle) is disclosed. The vehicle includes a fuel supply system coupled to the source of motive power, and a fuel purification system to minimize the presence of agents (such as carbon monoxide) in the reformate stream produced by the fuel supply system. The fuel purification system comprises a reactor defining a housing and a flowpath disposed within the housing. In one form, the source of motive power is a fuel cell that accepts fuel from the fuel system that has been cleaned up by the fuel purification system. Optionally, the fuel cell can be connected to ancillary equipment (such as batteries, capacitors, motors and related electricity converters) to provide power to such equipment. Additionally, the fuel cell may be a PEM fuel cell.

According to another aspect of the invention, a method of delivering fuel to a fuel cell system is disclosed. The method comprises configuring a fuel supply to include a fuel source, oxygen source and reformer, configuring a reactor for the removal of carbon monoxide from a reformate stream produced by the fuel supply, introducing fuel and oxygen together to create a fuel-oxygen mixture, evaporating the fuel-oxygen mixture such that the reformate stream is produced, purifying the reformate stream in the reactor and transporting the hydrogen-rich portion of the reformate stream that has been purified by the reactor to the fuel cell. The reactor configuration is as previously discussed.

According to yet another aspect of the invention, a method of purifying a methanol reformate stream coming from a fuel supply system is disclosed. The fuel supply system is made up of a fuel source, oxygen source and reformer configured to evaporate a mixture of fuel and oxygen coming from the fuel and oxygen sources. The configuration of the reactor is as previously discussed. The steps of the method include configuring a reactor for the removal of carbon monoxide from the reformate stream produced by the evaporated mixture coming from the fuel supply system, introducing fuel from the fuel source to oxygen from the oxygen source to create a fuel-oxygen mixture, evaporating the fuel-oxygen mixture such that the reformate stream is produced, passing the reformate stream through the shift subreactor to remove at least a portion of carbon monoxide resident in the reformate stream, exposing the reformate stream to the gaseous diffusion membrane subreactor such that the reformate stream separates into a first portion in the permeate branch and a second portion in the retentate branch, and exposing the first portion to the methanation subreactor for further purification of the first portion.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION

Figure 1:
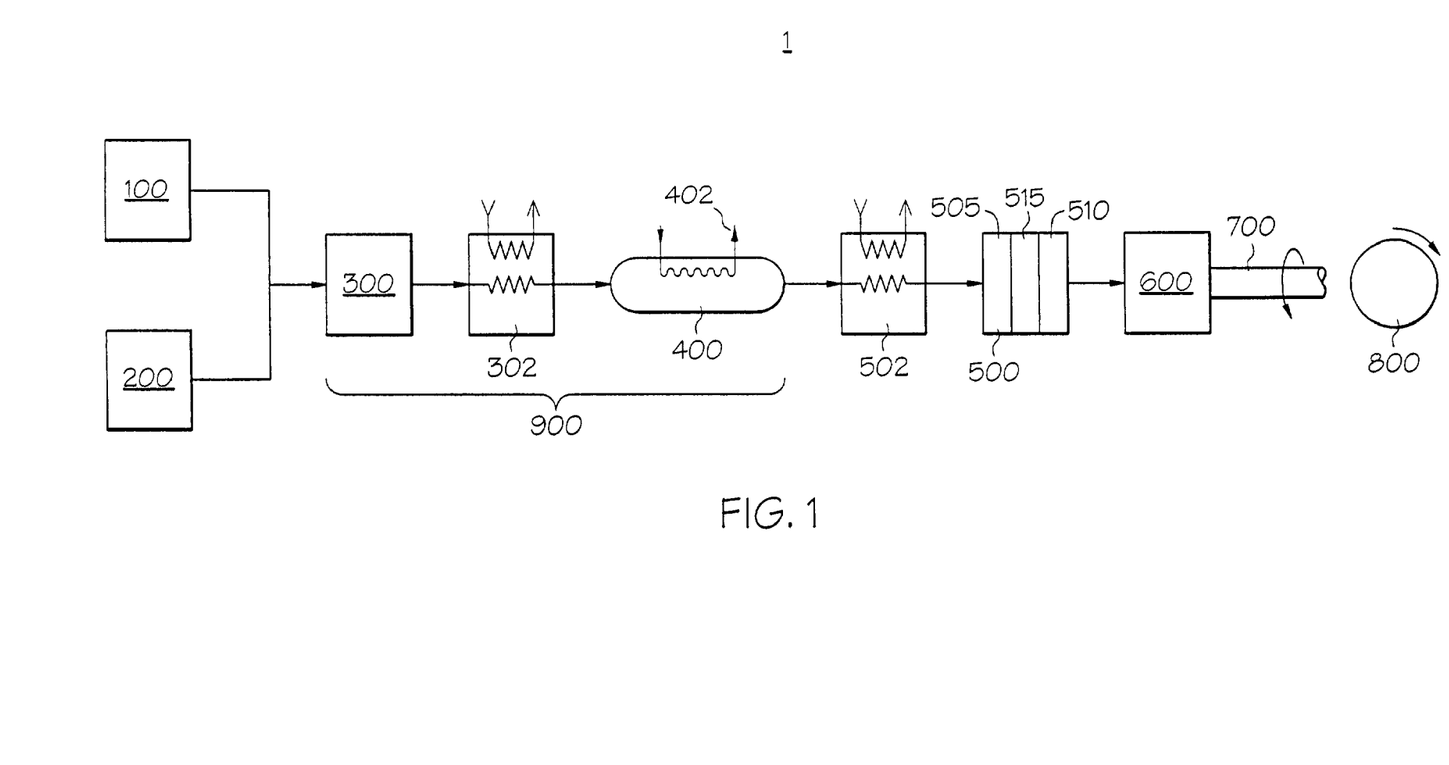
FIG. 1 shows a block diagram of a generalized mobile fuel cell system, including a fuel processing subsystem embodying the present invention.

Referring initially to FIG. 1, a block diagram highlights the major components of a mobile fuel cell system 1 according to the present invention. The system includes a fuel supply 100, oxygen supply 200, reformer 300, reactor 400 for cleaning up reform ate coming out of reformer 300, fuel cell 500, one or more energy storage devices 600, a drivetrain 700 and one or more wheels 800. Together, reformer 300 and reactor 400 make up fuel processing system 900. While the present system 1 is shown for mobile (such as vehicular) applications, it will be appreciated by those skilled in the art that the use of the fuel cell 500 and its ancillary fuel supply 100 oxygen supply 200 and fuel processing equipment (such as reformer 300 and reactor 400) are equally applicable to stationary applications. The energy storage devices 600 can be in the form of one or more batteries, capacitors, electricity converters, or even a motor to convert the electric current coming from the fuel cell 500 into mechanical power such as rotating shaft power that can be used to operate drivetrain 700 and wheels 800. The fuel supply system 100 takes a raw fuel, such as methanol ($CH_3OH$), and after combining it with an oxidant, such as oxygen from an oxygen supply 200, sends the mixture to reformer 300 where the mixture is converted to hydrogen ($H_2$) fuel and various byproducts in the following reactions:

$$CH_3OH + H_2O \rightarrow 3H_2 + CO_2$$

$$CH_3OH + 2O_2 \rightarrow 2H_2O + CO_2$$

$$CH_3OH \rightarrow 2H_2 + CO$$

The last of these reactions is a methanol decomposition reaction, and produces carbon monoxide (CO). Since many of the aforementioned reactions are reversible, heat exchangers 402 (shown schematically in FIG. 1) can be added in one or more of the locations shown to create temperature regimes in the reformate flowpath that will facilitate the reaction in the direction most beneficial to the fuel cell system 1. Similar heat exchangers 502 may be added installed to protect the various catalysts in the fuel cell 500 from damage due to excessive heat. Another optional heat exchanger 302 can be disposed between the reformer 300 and the reactor 400 to promote various reactions, such as the water gas shift (WGS) reaction shown by the following formula:

$$CO + H_2O \rightarrow CO_2 + H_2.$$

The WGS reaction takes place in a shift reactor (discussed in more detail below) and, under the proper temperature, pressure, steam ratio and reformate composition, can proceed in the direction shown to reduce the concentration of CO in the reformate stream, as well as to increase the $H_2$ yield. Nevertheless, some of the various by-products, if left untreated, would be in far too great a concentration for long-term viability of the fuel cell 500. When the fuel cell is configured as a PEM fuel cell, which typically includes a polymer membrane 515 disposed between an anode 505 and cathode 515, both of which can be coated with a platinum catalyst adjacent the membrane 515, the most notable poison from the reformation reactions is the CO produced in the methanol decomposition reaction, which if left untreated, preferentially reacts with and consumes the platinum.

Figure 2:
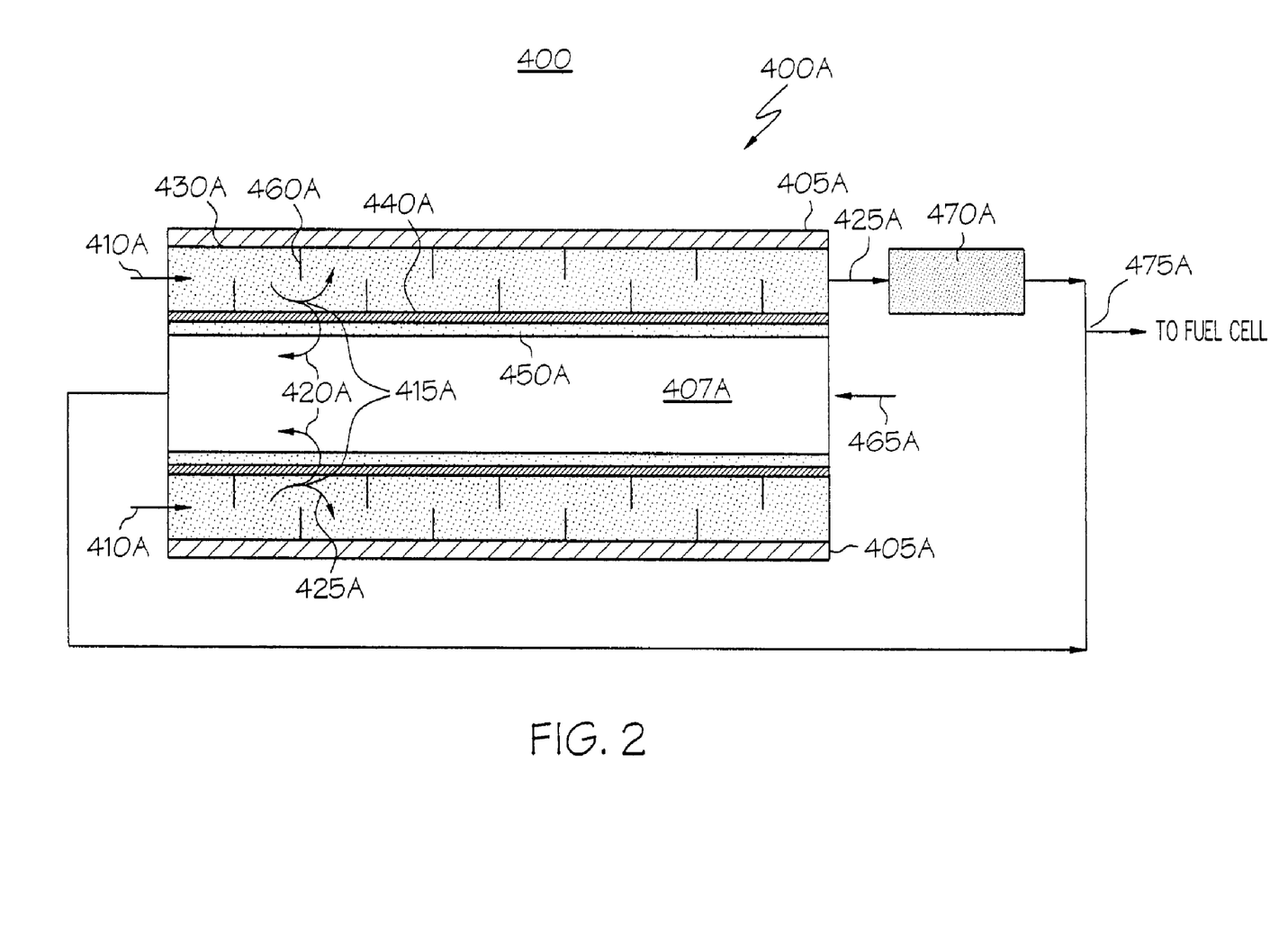
FIG. 2 shows a first embodiment of a reactor for purifying reformate.

In FIGS. 2 through 5, the major components of the reactor 400 are shown in their various embodiments. Referring with particularity to FIG. 2, reactor 400A includes three clean-up subreactors, made up of shift subreactor 430A, membrane subreactor 440A and methanation subreactor 450A, all disposed annularly within housing 405A such that a hollow center 407A is defined longitudinally therein. Reformate stream 415A enters the annulus along flowpath 410A, passing around baffles 460A such that a tortuous path and consequent extensive contact with the shift catalyst (not shown) is taken. In one form, the baffles 460A can be formed in situ with the porous structure of the shift subreactor 430A, while in another, they can be placed between segmented cylindrical-shaped units (not shown) that could, upon being placed end-to-end, be formed into a composite whole. The radially inward-facing surface of the annulus is adjacent the longitudinal hollow center 407A of the reactor housing 405A, where the radially inward-facing surface of the shift subreactor 430A is coated with a membrane to promote the diffusion of $H_2$ through the membrane and toward the hollow center 407A of the reactor 400A. The now $H_2$-rich portion of the reformate stream 415A is referred to as the permeate branch 420A. Under proper system operation, the permeate 420A has a higher $H_2$ concentration than the portion of the reformate stream 415A that does not pass through the membrane 440A, this $H_2$-depleted portion is subsequently referred to as the retentate 425A. The membrane is preferably a very thin metal, such as an alloy of palladium and silver (Pd—Ag) disposed on a porous substrate, such as alumina or aluminosilicate. Disposed even farther radially inward (i.e., on top of the membrane subreactor 440A) is the methanation subreactor 450A, which could be made from various metal compounds based on cobalt, iridium, iron, nickel, osmium, palladium, platinum, rhodium or ruthenium, coated onto a ceramic substrate. After the $H_2$-rich permeate passes through the methanation subreactor 450A, it enters the hollow center 407A of reactor 400A, where it can be carried off to the fuel cell 500 (not presently shown) by a sweep gas 465A, preferably made up of an inert carrier, such as nitrogen or steam. The retentate 425A continues along flowpath 410 until it exits the opposite side of the reactor from which it entered. From there, the retentate 425A can be further cleaned up by passing it through a downstream methanation catalyst 470A that functions in a manner similar to that of the methanation subreactor 450A. The retentate 425A that passes through the methanation catalyst 470A can be recombined with permeate 420A at recombination zone 475A, and then on to fuel cell anode 505 (not presently shown).

Figure 3:
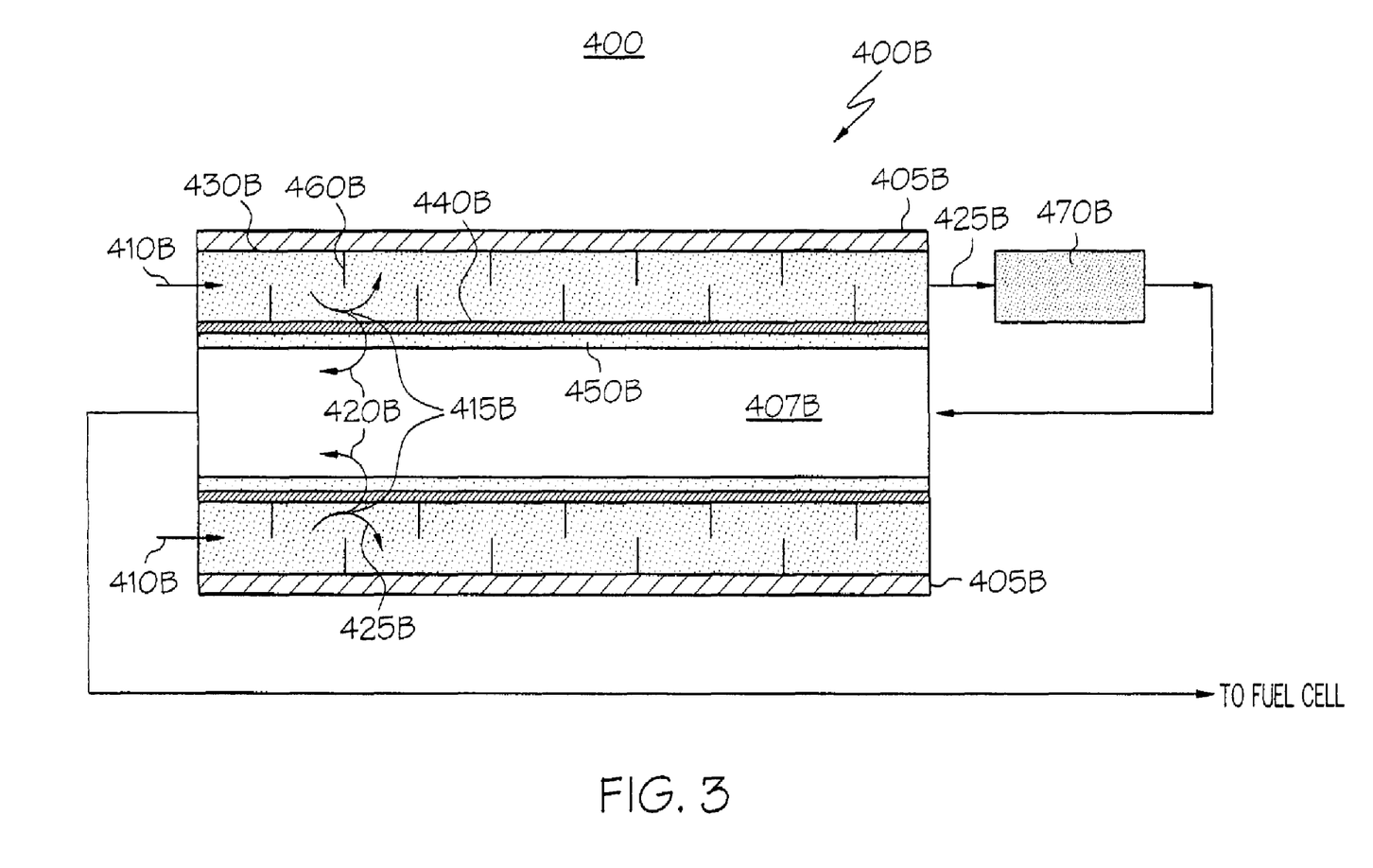
FIG. 3 shows a second embodiment of a reactor for purifying reformate.

Referring next to FIG. 3, a variation is shown, where reactor 400B is similarly constructed to reactor 400A shown in FIG. 2, including shift subreactor 430B, membrane subreactor 440B and methanation subreactor 450B disposed annularly within housing 405B. Unlike the configuration of FIG. 2, however, is that the retentate branch 425B of reformate stream 415B, after passing through downstream methanation catalyst 470B to reduce the CO concentration, is used to provide sweep through hollow center 407B of housing 405B, instead of recombining farther downstream. The use of the downstream methanation catalyst 470B reduces redundancy, thereby making this configuration particularly efficient from a structural perspective.

Figure 4:
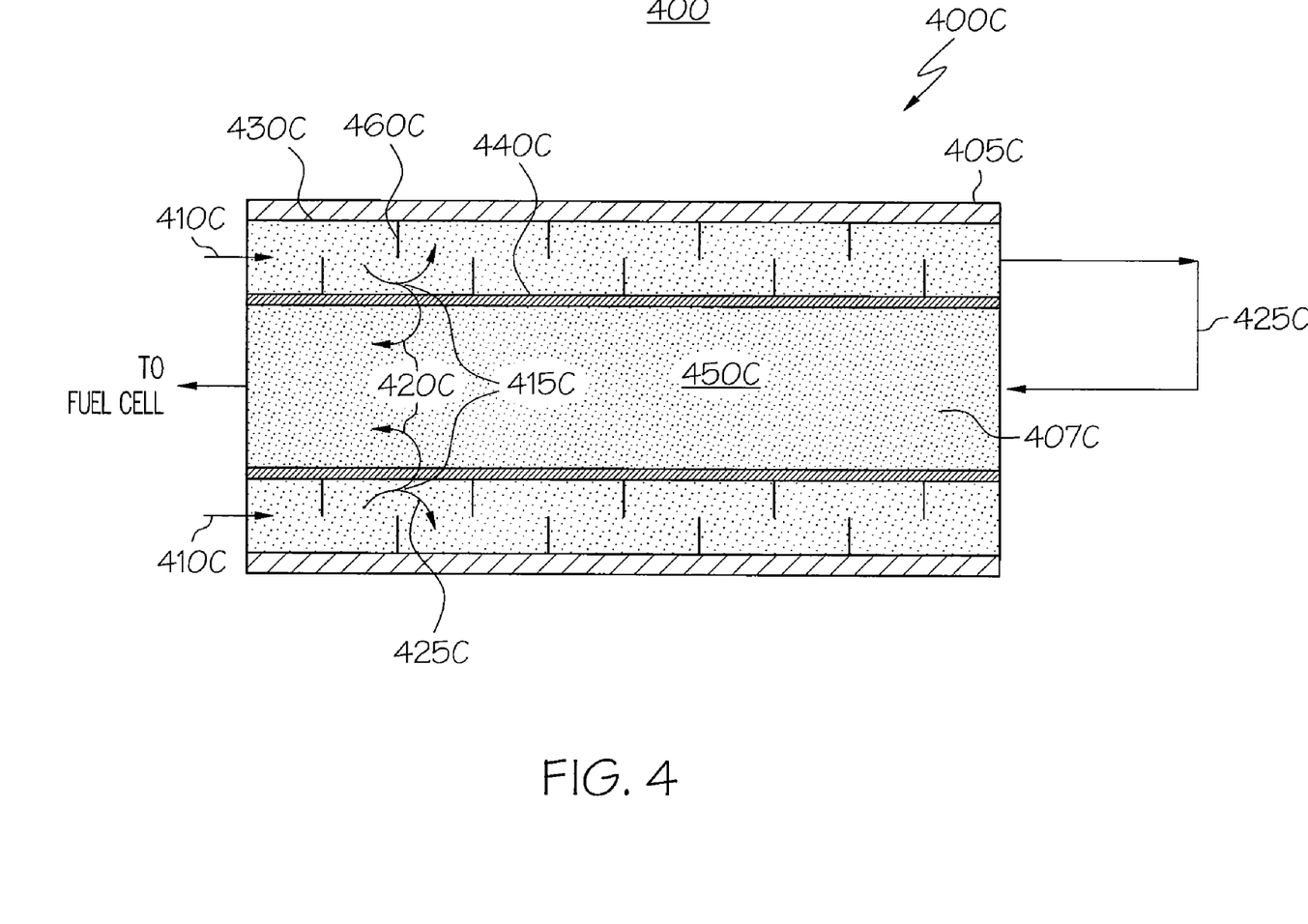
FIG. 4 shows a third embodiment of a reactor for purifying reform ate.

Referring next to FIG. 4, another variation of the reactor configuration is shown as 400C. Here, the longitudinal central portion 407C of the housing that is bounded by the annular section of the flowpath 410C is no longer hollow, but filled with the methanation subreactor 450C. This configuration further improves the structural efficiency presented in FIG. 3, as one methanation catalyst device can fulfill the purification requirements of both the permeate branch 420C and retentate 425C. While this approach involves the greatest degree of integration, and consequently occupies the least amount of reactor volume of the annular configurations, it also places the highest thermal load on the housing 400C. Accordingly, cooling can be introduced into the housing 400C, through known methods (such as water injection) to reduce the heat build-up in the reactor 400C. The retentate branch 425C passes sequentially through the shift subreactor 430C and the methanation subreactor 450C. After the retetate 425C passes through the methanation subreactor 450C and recombines with permeate 420C, the now-purified recombined stream is transported to the inlet of fuel cell 500.

Figure 5:
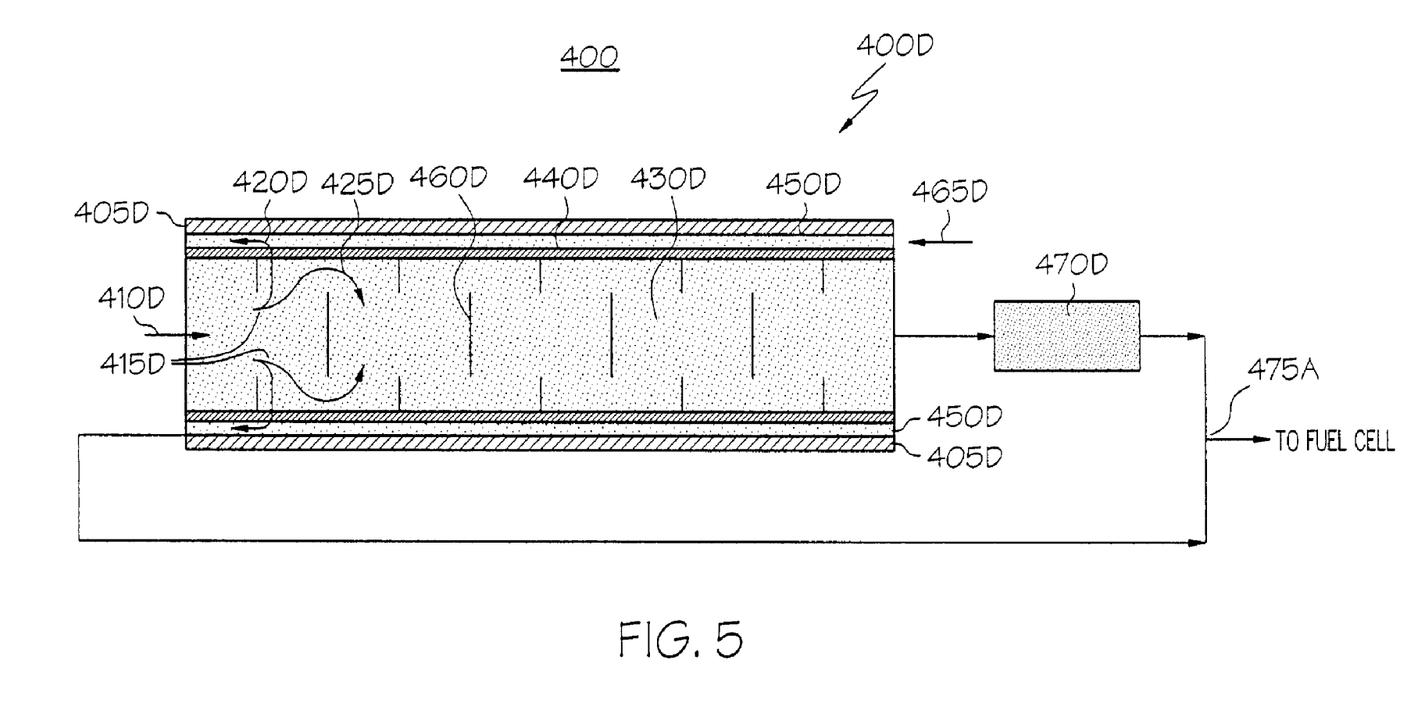
FIG. 5 shows a fourth embodiment of a reactor for purifying reformate.

Referring next to FIG. 5, still another variation of the reactor configuration is shown as 400D. Unlike the previous three configurations (which embodied a cylindrical, but annular, construction), the present configuration defines a solid cylindrical shape and accompanying flowpath 410D that traverses the center of the cylinder, as the shift subreactor 430D occupies a significant portion along the axial, central portion of housing 405D. Membrane subreactor 440D is disposed on a radially outward-facing surface of shift subreactor 430D, while methanation subreactor 450D is disposed on top of membrane subreactor 440D such that its radially outward-facing surface is adjacent the inner wall of housing 405D. As before, the membrane subreactor 440D allows $H_2$ from the reformate stream 415D to pass through and into permeate 420D, which then can be subjected to the methanation subreactor 450D for additional purification. As before, the retentate 425D continues through the tortuous path defined by baffles 460D until it exits reactor 400D. From there, it can receive additional purification treatment from downstream methanation catalyst 470D that functions in a manner similar to that of the methanation subreactor 450D. Although shown outside of housing 405D of reactor 400D, downstream methanation catalyst 470D could be integrated such that housing 405D is common to all the subreactors 430D, 440D and 450D, in addition to the methanation catalyst 470D. As with the configuration depicted in FIG. 2, the retentate 425D that passes through the methanation catalyst 470D can then be recombined at recombination zone 475D with permeate 420D, and then on to fuel cell anode 505 (not presently shown). Also as with the configuration shown in FIG. 2, a sweep 465D can be incorporated to help transport permeate 420D through the housing 400D and toward the recombination zone 475D. Moreover, the sweep 465D can be configured to run in either a co-flow or counterflow arrangement with reformate stream 415D. Of the four configurations shown, this one has the potential for being the most robust, as the membrane coating (not shown) making up the active portion of the membrane subreactor 440D might be otherwise susceptible to flaking off its substrate under high reformate gas pressure loads. In the present configuration, the radially outward-moving reformate stream 415D gas flow exits the shift subreactor 430D then encounters the metallic membrane layer, which being supported from the even farther radially-outward porous substrate such that it is effectively sandwiched between the structure of the shift and membrane subreactors 430D and 440D respectively, is made more resistant to being separated from its supporting substrate under the effects of the pressurized reformate stream 415D. This is advantageous in that it allows the membrane subreactor 440D to operate over a wide range of gas pressures from the reformate stream 415D.

Figure 6:
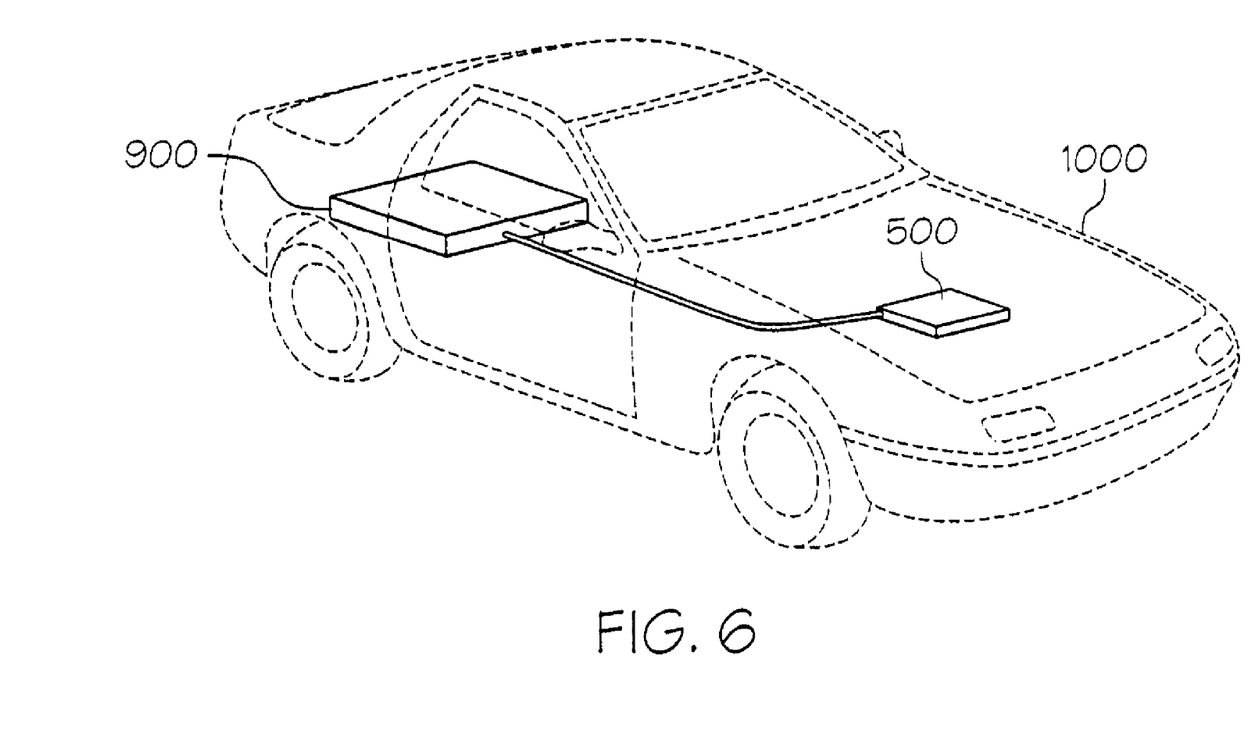
FIG. 6 shows the placement of a fuel cell, as well as a fuel processing system into a vehicle.

Referring next to FIG. 6, a vehicle 1000 incorporating a fuel cell system according to the present invention is shown. Fuel cell 500 is fluidly coupled to a fuel cell processing system 900 that includes reformer 300 and reactor 400 (neither of which are shown). Fuel processing system 900 accepts fuel and an oxidant (such as oxygen) from respective fuel and oxygen supplies 100 and 200 (neither of which are shown) and prepares the fuel for consumption in fuel cell 500. While the vehicle 1000 is shown notionally as a car, it will be appreciated by those skilled in the art that the use of fuel cell systems in other vehicular forms is also within the scope of the present invention.

While certain representative embodiments and details have been shown for purposes of illustrating the invention, it will be apparent to those skilled in the art that various changes may be made without departing from the scope of the invention, which is defined in the appended claims.

What is claimed is:

1. A reactor for the removal of carbon monoxide from a reformate stream, said reactor comprising:
   a housing;
   a flowpath disposed within said housing, said flowpath configured to bifurcate said reformate stream into a permeate branch and a retentate branch, said flowpath comprising:
      a shift subreactor configured to convert at least some of the carbon monoxide resident in said reformate stream into hydrogen and carbon dioxide, said shift subreactor comprising at least one baffle disposed therein;
      a gaseous diffusion membrane subreactor in fluid communication with said shift subreactor, said gaseous diffusion membrane subreactor configured to allow a hydrogen-rich portion of said reformate stream to pass therethrough and into said permeate branch; and
      a first methanation subreactor in downstream fluid communication with said gaseous diffusion membrane subreactor, said first methanation subreactor configured to further purify said hydrogen-rich portion of said reformate stream in said permeate branch, wherein said shift subreactor, gaseous diffusion membrane subreactor and first methanation subreactor are concentrically placed relative to one another to define a generally cylindrical shape compatible with an interior surface of said housing; and
   a second methanation subreactor fluidly coupled to said shift subreactor to accept said retentate branch therefrom such that each of said retentate branch and said permeate branch pass through a dedicated one of said methanation subreactors.

2. A reactor according to claim 1, wherein said shift subreactor is a water gas shift subreactor.

3. A reactor according to claim 1, wherein said housing is generally tubular in shape.

4. A reactor according to claim 1, further comprising an inert gas sweep mechanism configured to transport said hydrogen-rich portion of said reformate stream resident in said permeate branch from said reactor.

5. A reactor according to claim 1, wherein said shift subreactor is cylindrical in shape.

6. A reactor according to claim 5, wherein said cylindrical shift subreactor is a substantially solid cylinder.

7. A reactor according to claim 6, wherein said gaseous diffusion membrane subreactor is disposed on an outer surface of said shift subreactor.

8. A reactor according to claim 7, wherein said first methanation subreactor is disposed on an outer surface of said gaseous diffusion membrane subreactor such that said gaseous diffusion membrane subreactor is supported on one opposing surface by said outer surface of said shift subreactor and on the other opposing surface by an inner surface of said first methanation subreactor.

9. A reactor according to claim 1, further comprising a recombination zone configured to join said permeate branch and said retentate branch downstream of their respective methanation subreactors.

10. A reactor according to claim 5, wherein said cylindrical shift subreactor is annular in shape.

11. A reactor according to claim 10, wherein said gaseous diffusion membrane subreactor is disposed on an inner surface of said shift subreactor.

12. A reactor according to claim 11, wherein said first methanation subreactor is disposed on an inner surface of said gaseous diffusion membrane subreactor.

13. A reactor according to claim 12, wherein said shift subreactor, gas diffusion membrane subreactor and first methanation subreactor are constructed to define a substantially hollow longitudinal bore through said tubular housing.

14. A reactor according to claim 12, further comprising a recombination zone configured to join said permeate branch and said retentate branch downstream of their respective methanation subreactors.

15. A fuel processing system for a proton exchange membrane fuel cell, said fuel processing system comprising:
   a reformer configured to convert raw fuel into a reformate stream; and
   a reactor for the removal of carbon monoxide from said reformate stream, said reactor comprising:
      a housing;
      a flowpath disposed within said housing, said flowpath configured to bifurcate said reformate stream into a permeate branch and a retentate branch, said flowpath comprising:
         a shift subreactor configured to convert at least some of the carbon monoxide resident in said reformate stream into hydrogen and carbon dioxide, said shift subreactor comprising at least one baffle disposed therein;
         a gaseous diffusion membrane subreactor in fluid communication with said shift subreactor, said gaseous diffusion membrane subreactor configured to allow a hydrogen-rich portion of said reformate stream to pass therethrough and into said permeate branch; and
         a first methanation subreactor in downstream fluid communication with said gaseous diffusion membrane subreactor, said first methanation subreactor configured to further purify said hydrogen-rich portion of said reformate stream in said permeate branch, wherein said shift subreactor, gaseous diffusion membrane subreactor and first methanation subreactor are concentrically placed relative to one another to define a generally cylindrical shape compatible with an interior surface of said housing; and
      a second methanation subreactor fluidly coupled to said shift subreactor to accept said retentate branch therefrom such that each of said retentate branch and said permeate branch pass through a dedicated one of said methanation subreactors.

16. A proton exchange membrane fuel cell system comprising:
   a fuel supply;
   an oxygen supply;
   a reformer configured to form a vapor from a mixture of fuel and oxygen coming from said fuel and air supplies, said vapor defining a reformate stream;
   a reactor for the removal of carbon monoxide from said reformate stream, said reactor comprising:
      a housing;

a flowpath disposed within said housing, said flowpath configured to bifurcate said reformate stream into a permeate branch and a retentate branch, said flowpath comprising:
  a shift subreactor configured to convert at least some of the carbon monoxide resident in said reformate stream into hydrogen and carbon dioxide, said shift subreactor comprising at least one baffle disposed therein;
  a gaseous diffusion membrane subreactor in fluid communication with said shift subreactor, said gaseous diffusion membrane subreactor configured to allow a hydrogen-rich portion of said reformate stream to pass therethrough and into said permeate branch; and
  a first methanation subreactor in downstream fluid communication with said gaseous diffusion membrane subreactor, said first methanation subreactor configured to further purify said hydrogen-rich portion of said reformate stream in said permeate branch, wherein said shift subreactor, gaseous diffusion membrane subreactor and first methanation subreactor are concentrically placed relative to one another to define a generally cylindrical shape compatible with an interior surface of said housing; and
  a second methanation subreactor fluidly coupled to said shift subreactor to accept said retentate branch therefrom such that each of said retentate branch and said permeate branch pass through a dedicated one of said methanation subreactors; and
a fuel cell in fluid communication with said reactor, said fuel cell configured to receive said hydrogen-rich portion of said reformate stream that has passed through said a first and second methanation subreactors.

17. A power production system comprising:
a methanol supply;
an oxygen supply;
an evaporator configured to produce a reformate stream from a mixture of methanol and oxygen coming from said methanol and air supplies;
a reactor for the removal of carbon monoxide from said reformate stream, said reactor comprising:
  a housing;
  a flowpath disposed within said housing, said flowpath configured to bifurcate said reformate stream into a permeate branch and a retentate branch, said flowpath comprising:
    a shift subreactor configured to convert at least some of the carbon monoxide resident in said reformate stream into hydrogen and carbon dioxide, said shift subreactor comprising at least one baffle disposed therein;
    a gaseous diffusion membrane subreactor in fluid communication with said shift subreactor, said gaseous diffusion membrane subreactor configured to allow a hydrogen-rich portion of said reformate stream to pass therethrough and into said permeate branch; and
    a first methanation subreactor in downstream fluid communication with said gaseous diffusion membrane subreactor, said first methanation subreactor configured to further purify said hydrogen-rich portion of said reformate stream in said permeate branch, wherein said shift subreactor, gaseous diffusion membrane subreactor and first methanation subreactor are concentrically placed relative to one another to define a generally cylindrical shape compatible with an interior surface of said housing; and
  a second methanation subreactor fluidly coupled to said shift subreactor to accept said retentate branch therefrom such that each of said retentate branch and said permeate branch pass through a dedicated one of said methanation subreactors;
a fuel cell in fluid communication with said reactor, said fuel cell comprising:
  a fuel flowpath fluidly coupled to said hydrogen-rich portion of said reformate stream in at least one of said permeate branch and said retentate branch;
  an anode in fluid communication with said fuel flowpath;
  an oxidant flowpath configured to permit fluid communication between an air supply and said fuel cell;
  a cathode in fluid communication with said oxidant flowpath;
  a membrane disposed between said anode and said cathode;
  a catalyst disposed on at least one of said anode and cathode; and
  an electrical circuit coupled between said anode and said cathode, said electrical circuit configured to permit current flow therebetween; and
a load coupled to said electrical circuit.

18. A power production system according to claim 17, wherein said power production system is portable.

19. A power production system according to claim 17, wherein said load comprises an energy storage device.

20. A power production system according to claim 19, wherein said energy storage device is a battery.

21. A power production system according to claim 17, wherein said load comprises a vehicle drivetrain.

22. A vehicle comprising:
a source of motive power;
a fuel supply system coupled to said source of motive power, said fuel supply system configured to combine fuel and oxygen such that a vapor from a mixture of said fuel and oxygen defines a reformate stream; and
a fuel purification system for the removal of carbon monoxide from said reformate stream, said fuel purification system comprising:
  a reactor defining a housing;
  a flowpath disposed within said housing, said flowpath configured to bifurcate said reformate stream into a permeate branch and a retentate branch, said flowpath comprising:
    a shift subreactor configured to convert at least some of the carbon monoxide resident in said reformate stream into hydrogen and carbon dioxide, said shift subreactor comprising at least one baffle disposed therein;
    a gaseous diffusion membrane subreactor in fluid communication with said shift subreactor, said gaseous diffusion membrane subreactor configured to allow a hydrogen-rich portion of said reformate stream to pass therethrough and into said permeate branch; and
    a first methanation subreactor in downstream fluid communication with said gaseous diffusion membrane subreactor, said first methanation subreactor configured to further purify said hydrogen-rich portion of said reformate stream in said permeate branch, wherein said shift subreactor, gaseous diffusion membrane subreactor and first methanation subreactor are concentrically placed relative to one another to define a generally cylindrical shape compatible with an interior surface of said housing; and a second methanation subreactor fluidly coupled to said shift subreactor to accept said retentate branch therefrom such that each of said retentate branch and said permeate branch pass through a dedicated one of said methanation subreactors.

23. A vehicle according to claim 22, further comprising ancillary equipment coupled to said source of motive power such that power provided therefrom can be used to operate said equipment.

24. A vehicle according to claim 22, wherein said equipment is selected from the group consisting of batteries, capacitors, motors or related electricity converters.

25. A vehicle according to claim 23, wherein said source of motive power is a fuel cell.

26. A vehicle according to claim 25, wherein said fuel cell is a proton exchange membrane fuel cell.

* * * * *